United States Patent [19]

Gluntz

[11] Patent Number: 5,570,401
[45] Date of Patent: Oct. 29, 1996

[54] BWR CONTAINMENT CONFIGURATION HAVING PARTITIONED WETWELL AIRSPACE

[75] Inventor: Douglas M. Gluntz, San Jose, Calif.

[73] Assignee: General Electric Company, San Jose, Calif.

[21] Appl. No.: 532,292

[22] Filed: Sep. 22, 1995

[51] Int. Cl.⁶ .................................................. G21C 9/004
[52] U.S. Cl. ............................................................ 376/283
[58] Field of Search .................................. 376/283, 298, 376/299

[56] References Cited

U.S. PATENT DOCUMENTS

| 5,211,906 | 5/1993 | Hatamiya et al. | 376/283 |
| 5,295,168 | 3/1994 | Gluntz et al. | 376/283 |

FOREIGN PATENT DOCUMENTS

| 64-16991 | 1/1989 | Japan | 376/283 |

Primary Examiner—Daniel D. Wasil
Attorney, Agent, or Firm—James E. McGinness

[57] ABSTRACT

An improved containment configuration for a boiling water reactor in which the wetwell airspace is divided into a multiplicity of chambers through the use of wetwell airspace divider partitions. The partitions extend to below the water level of the suppression pool so that the gas in one airspace chamber cannot communicate with another airspace chamber. Each wetwell airspace chamber can be placed in flow communication with the drywell via a respective open vacuum breaker. When one vacuum breaker fails in the open position or when wetwell/drywell steam bypass leakage into one chamber occurs, the pressure differential between the wetwell airspace chamber and the drywell drops. However, because the leaking chamber is isolated, the pressure differential between the drywell and the other chambers is unaffected. Thus, the PCC heat exchangers corresponding to non-leaking chambers can continue to operate effectively, even if the PCC heat exchanger corresponding to the leaking chamber is rendered ineffective.

12 Claims, 4 Drawing Sheets

BWR CONTAINMENT CONFIGURATION HAVING PARTITIONED WETWELL AIRSPACE

FIELD OF THE INVENTION

This invention relates generally to protection systems for shutting down a boiling water reactor (BWR) and maintaining it in a safe condition in the event of a system transient or malfunction that might cause damage to the nuclear fuel core, most likely from overheating. In particular, the invention relates to passive systems applied to BWRs for suppressing the pressure inside the containment following a postulated accident.

BACKGROUND OF THE INVENTION

BWRs have conventionally utilized active safety systems to control and mitigate accident events. Those events varied from small break to design basis accidents. Passive safety systems have been studied for use in simplified BWRs (SBWRs) because of their merits in reducing specialized maintenance and surveillance testing of the safety-related equipment, and in eliminating the need for AC power, thereby improving the reliability of essential safety system responses necessary for the control and mitigation of adverse effects produced by accidents. SBWRs can additionally be designed with certain passive safety features that provide more resistance to human error in accident control and mitigation.

The current SBWR designs utilize passive operational principles for the key safety systems employed to (a) provide emergency coolant injection, for assured core cooling over the design basis post-LOCA lifetime (specifically, 72 hr for these designs), and (b) provide assured containment heat removal over this same design basis accident duration. The decay heat removal accomplishes, by essentially passive means, the transfer of core decay heat (which manifests itself ultimately as hot steam inside the containment drywell) to the reactor building environs through the use of passive containment cooling (PCC) heat exchangers, as disclosed, for example, in U.S. Pat. No. 5,295,168.

The term "passive" as used to describe the actions of such safety systems, is defined to include systems which operate exclusively on stored energy, such as batteries, or pressurized gases, or chemical charges, or appropriately positioned tanks of water which can drain by gravity, to accomplish the essential safety function. The term "passive" further implies that no rotating or reciprocating machinery is used; valves, where used, are one-time change-of-position valves such as squib valves, or, in the case of check valves, are altogether unpowered insofar as their open/close state is concerned.

Referring to FIG. 1, a typical SBWR includes a reactor pressure vessel 10 containing a nuclear reactor fuel core 12 submerged in water 14. The fuel core heats the water to generate steam 14a which is discharged from the reactor pressure vessel through a main steam line 16 and used to power a steam turbine-generator for producing electrical power.

The reactor pressure vessel is surrounded by a containment vessel 18. The volume inside containment vessel 18 and outside reactor pressure vessel 10 is called the drywell 20. The containment vessel is a concrete structure having a steel liner and is designed to withstand elevated pressure inside the drywell. The drywell typically contains a noncondensable gas such as nitrogen.

In accordance with the conventional SBWR containment design, an annular suppression chamber or wetwell 22 surrounds the reactor pressure vessel within the containment vessel. The wetwell 22 is partially filled with water to form the suppression pool 24 and to define a wetwell airspace 26 thereabove. The wetwell 22 serves various functions, including being a heat sink in the event of certain accidents. For example, one type of accident designed for is a loss-of-coolant accident (LOCA) in which steam from the reactor pressure vessel 10 leaks into the drywell 20. Following the LOCA, the reactor is shut down but pressurized steam and residual decay heat continue to be generated for a certain time following the shutdown. Steam escaping into the drywell 20 is channeled into the wetwell 22 through a multiplicity of (e.g., eight) vertical flow channels built into the wetwell wall 76, each flow channel 27 having a plurality of (e.g., three) horizontal vents 28. Steam channeled into the wetwell 22 through the vents 28 carries with it portions of the drywell noncondensable gas 30. The steam is condensed and the noncondensable gas 30 is buoyed upwardly to the wetwell airspace 26, where it accumulates.

When the pressure in wetwell airspace 26 exceeds that in the drywell 20, one or more vacuum breakers 36, which penetrate the wetwell diaphragm 74, are opened to allow noncondensable gas 30 in the wetwell airspace 26 to vent to the drywell 20. The vacuum breakers 36 remain closed when the pressure in drywell 20 is equal to or greater than the pressure in the wetwell airspace 26.

The system further includes one or more gravity-driven cooling system (GDCS) pools 38 located above the wetwell 22 within the containment vessel 18. The GDCS pool 38 is partially filled with water 42 to define a GDCS airspace 44 thereabove. The GDCS pool 38 is connected to an outlet line 46 having a valve 48 which is controlled by controller 40. The valve 48 is opened to allow GDCS water 42 to drain by gravity into pressure vessel 10 for cooling the core following a LOCA. Steam and noncondensable gas can be channeled directly into the GDCS airspace 44 from the drywell 20 via an inlet 50. An optional condenser or heat exchanger 72 may be provided for condensing steam channeled through inlet 50 following draining of the GDCS water 42 for drawing in additional steam and noncondensable gas.

The wetwell 22 is disposed at an elevation which is above the core 12 and is connected to an outlet line 32 having a valve 34 which is controlled by a controller 40. The valve 34 is opened after an appropriate time delay from the opening of valve 48 to allow water from the suppression pool 24 to also drain by gravity into the pressure vessel 10 for cooling the core following a LOCA.

In the SBWR design, a passive containment cooling system (PCCS) is provided for removing heat from the containment vessel 18 during a LOCA. A condenser pool 52, configured as a collection of subpools (not shown) interconnected so as to act as a single common large pool, is disposed above the containment vessel 18 and above the GDCS pool 38. The condenser pool 52 contains a plurality of PCC heat exchangers 54 (only one of which is shown in FIG. 1), also commonly referred to as PCC condensers, as well as isolation condensers (not shown), all submerged in isolation water 56. The condenser pool 52 includes one or more vents 58 to atmosphere outside the containment for venting the airspace above the condenser pool water 56 for discharging heat therefrom upon use of the PCC heat exchanger 54.

The PCC heat exchanger 54 has an inlet line 60 in flow communication with the drywell 20 and an outlet line 62 joined to a collector chamber 64 from which a vent pipe 66 extends into the wetwell 22 and a condensate return conduit 68 extends into the GDCS pool 38. The PCC heat exchanger 54 provides passive heat removal from the drywell 20 following the LOCA, with steam released into the drywell flowing through inlet 60 into the PCC heat exchanger wherein it is condensed. The noncondensable gas (e.g., nitrogen) within the drywell is carried by the steam into the PCC heat exchanger and must be separated from the steam to provide effective operation of the PCC heat exchanger. The collector chamber 64 separates the noncondensable gas from the condensate, with the separated noncondensable gas being vented into the wetwell 22, and the condensate being channeled into the GDCS pool 38. A water trap or loop seal 70 is provided at the end of the condensate return conduit 68 in the GDCS pool 38 to restrict backflow of heated fluids from the GDCS pool 38 to the wetwell 22 via the condensate return conduit 68, which would bypass PCC heat exchanger 54.

Accordingly, this system is configured to transport the noncondensable gas from the drywell 20 to the wetwell airspace 26 and then condense steam from the drywell in the PCC heat exchanger 54. The noncondensable gas will remain in the enclosed wetwell until the PCC heat exchanger 54 condenses steam faster than it is released from the reactor pressure vessel. When this occurs, the PCC heat exchanger lowers the drywell pressure below that of the wetwell, which causes the vacuum breakers 36 to open, thereby allowing noncondensable gas stored in the wetwell to return to the drywell.

FIG. 2 depicts a BWR having at least two vertical flow channels 27A and 27B in flow communication with respective horizontal vents 28A and 28B; at least two vacuum breakers 36A and 36B; at least two GDCS pools 38A and 38B; and at least two PCC heat exchangers 54A and 54B having respective inlet lines 60A and 60B, vent pipes 66A and 66B, and condensate return conduits 68A and 68B. However, it is understood that the present invention applies to PCCSs having two or more PCC heat exchangers immersed in the condenser pool 56 and in flow communication with the wetwell 22.

Referring to FIG. 2, steam released from the reactor pressure vessel (RPV) consequent to the LOCA, and any noncondensable gases (predominantly nitrogen) filling the portion of the drywell airspace, are caused to flow through PCC heat exchangers 54A and 54B, where the steam component in this mixture is condensed. In the lower portion of each PCC heat exchanger, in a component known as the PCC lower drum, phase separation occurs between the noncondensable gases and the condensate. In the heat exchanger's tube bank, which stands immediately upstream of the lower drum, reactor core decay heat, represented by the enthalpy of the steam vapor entering the PCC heat exchangers, is rejected from the SBWR containment atmosphere to the condenser pool 52 which is externally positioned with respect to the primary containment. Through suitable pipings, the condensate is routed from the lower drum(s) to a selected location, such as GDCS pools 38A and 38B, where the condensate can be returned to the RPV via GDCS pool-to-RPV injection lines. The noncondensable gases collected in the lower drum(s) are driven down respective PCC heat exchanger vent pipes 66A and 66B, at the termination of which the noncondensable gases issue into the water comprising the suppression pool 24, whereupon gases bubble upward to issue into and thereby increase the inventory of noncondensable gases contained in the wetwell airspace 26.

The diaphragm floor 74 separating the drywell airspace 20 from the wetwell airspace 26 is provided to produce a leaktight cover over the wetwell airspace. By its presence, a positive differential pressure ($\Delta P$) (viz., the drywell airspace pressure being higher than the wetwell airspace pressure) naturally becomes established due to the steam produced continually post-LOCA in the RPV and which steam is being released out the LOCA pipe break and/or out of opened RPV depressurization valves. Steam generation is the natural result of core decay heat generation even with the reactor core being rendered in a subcritical state. Gases added to the wetwell airspace, which gas additions cause a rise in this compartment's total pressure, are counterbalanced by the development of higher pressure in the drywell airspace as a consequence of the natural and unstoppable steam additions produced by the RPV. The amount of the $\Delta P$ is determined principally by the submergence of the termination of the PCC heat exchanger vent pipes 66A and 66B in the suppression pool 24. In general, this $\Delta P$ will be at or slightly above the specific amount represented by the excess of drywell airspace pressure needed to depress the water out of the PCC heat exchanger vent pipe against the backpressure represented by the wetwell airspace pressure acting on the suppression pool surface.

The vacuum breakers 36A and 36B are provided to relieve pressure within the wetwell airspace under circumstances where the drywell airspace goes temporarily into a suddenly depressed pressure condition. This can happen, for example, when relatively cold coolant issues out the RPV pipe break, rapidly condensing drywell airspace steam vapor, consequential to certain LOCA scenarios. Such pressure relief is needed to prevent uplift loads on the diaphragm floor 74 from exceeding design limits. In such cases the vacuum breaker(s) open sufficiently long to bring drywell airspace pressure into balance with wetwell airspace pressure. Following this, the vacuum breakers must reclose to reestablish the leaktight boundary between the drywell airspace 20 and the wetwell airspace 26, so that the vital passive operation of the PCC heat exchangers can continue.

The vacuum breakers are therefore designed and prooftested to have particularly high reliability for re-closing into a leaktight state. If leaktightness in one or more vacuum breakers does not occur following vacuum breaker operation, a condition would develop (see FIG. 3) wherein positive $\Delta P$ necessary to force steam flows through the PCC heat exchangers could reduce to levels at which insufficient $\Delta P$ exists to enable noncondensables to issue out the end of the PCC heat exchanger vent pipes. If this happens, the noncondensable gases will accumulate within these pipes and within the heat transfer tubes of the PCC heat exchangers. With this development, the heat rejection capability of the PCC heat exchangers is degraded and possibly lost altogether.

FIG. 3 illustrates the fact that, should any one of the vacuum breakers (e.g., 36A) fail in the fail-open state, pressure in the wetwell airspace 26 will come into equilibrium with pressure in the drywell airspace 20. There will be no positive $\Delta P$ to produce flow of the steam and noncondensable gas mixture through the PCC heat exchangers 54. FIG. 3 also shows schematically the prospect of a leakage pathway, hereinafter referred to as "drywell/wetwell bypass leakage", which could exist in the otherwise intended leaktight diaphragm floor 74 [and its liner(s)]. Thus, either a failed-open vacuum breaker and/or a drywell/wetwell bypass leakage of sufficient size will bring a halt to the SBWR containment's passive decay heat rejection mechanisms. [For the SBWR, a "sufficient size" is a pathway having a flow area of just a very few square centimeters.] The consequence of such an event is that SBWR containment pressure would rise far above design. Under such conditions, high radiological releases outside the containment, well above "design basis" amounts, could occur. Therefore the described passive decay heat rejection process of the SBWR may be vulnerable to the consequences of a single active failed-open vacuum breaker.

The ordinary design approach to address this concern would be to re-design the vacuum breaker to have a double-disk design or to provide a configuration having two vacuum breakers in series wherein the current vacuum breaker can be coupled into the equivalent of a "double-disk" configuration. If one disk fails open, and if this disk's operation is totally independent of a second, in-series disk, then reclosure to a leaktight condition for the integrated vacuum breaker device is assured. Double-disk vacuum breakers have been employed in earlier BWRS. However, such an approach has many difficulties, including, for SBWR's vacuum breakers: probable modification of operating performance, costly redesign and schedule delays, costs for re-testing and requalifying the vacuum breaker, possible space arrangement conflicts, added in-plant surveillance testing and maintenance difficulties, and so forth.

One "active" design approach is to use wetwell sprays powered by spray pumps, but this is not an admissible solution for the SBWR, which proscribes against use of active systems during the first 72 hr post-LOCA to address prospective threats to development of containment overpressure. Thus, there is a need for a passive approach for preventing total loss of the SBWR containment's passive heat rejection capability, given a drywell/wetwell bypass leakage of sufficient size.

SUMMARY OF THE INVENTION

The present invention is an improved SBWR containment configuration which provides an economically advantageous approach for tolerating a single active failed-open vacuum breaker condition without total loss of the passive heat rejection capability of the PCCS. The invention embodies a design approach whereby the occurrence of a single drywell/wetwell bypass leakage of any size can be tolerated, i.e., without causing total loss of the SBWR containment's passive heat rejection capability.

In accordance with a preferred embodiment of the invention, the wetwell airspace is divided into a multiplicity of chambers through the use of wetwell airspace divider partitions. The partitions extend to below the water level of the suppression pool so that the gas in one airspace chamber cannot communicate with another airspace chamber. Each wetwell airspace chamber can be placed in flow communication with the drywell via a respective open vacuum breaker. When one vacuum breaker fails in the open position or when wetwell/drywell steam bypass leakage into one chamber occurs, the pressure differential between the wetwell airspace chamber and the drywell drops. However, because the leaking chamber is isolated, the pressure differential between the drywell and the unimpaired chambers is unaffected. Thus, the PCC heat exchangers corresponding to these non-leaking chambers can continue to operate effectively, even if the PCC heat exchanger corresponding to the leaking chamber is rendered ineffective.

DETAILED DESCRIPTION OF THE PREFERRED EMBODIMENTS

Figure 1:
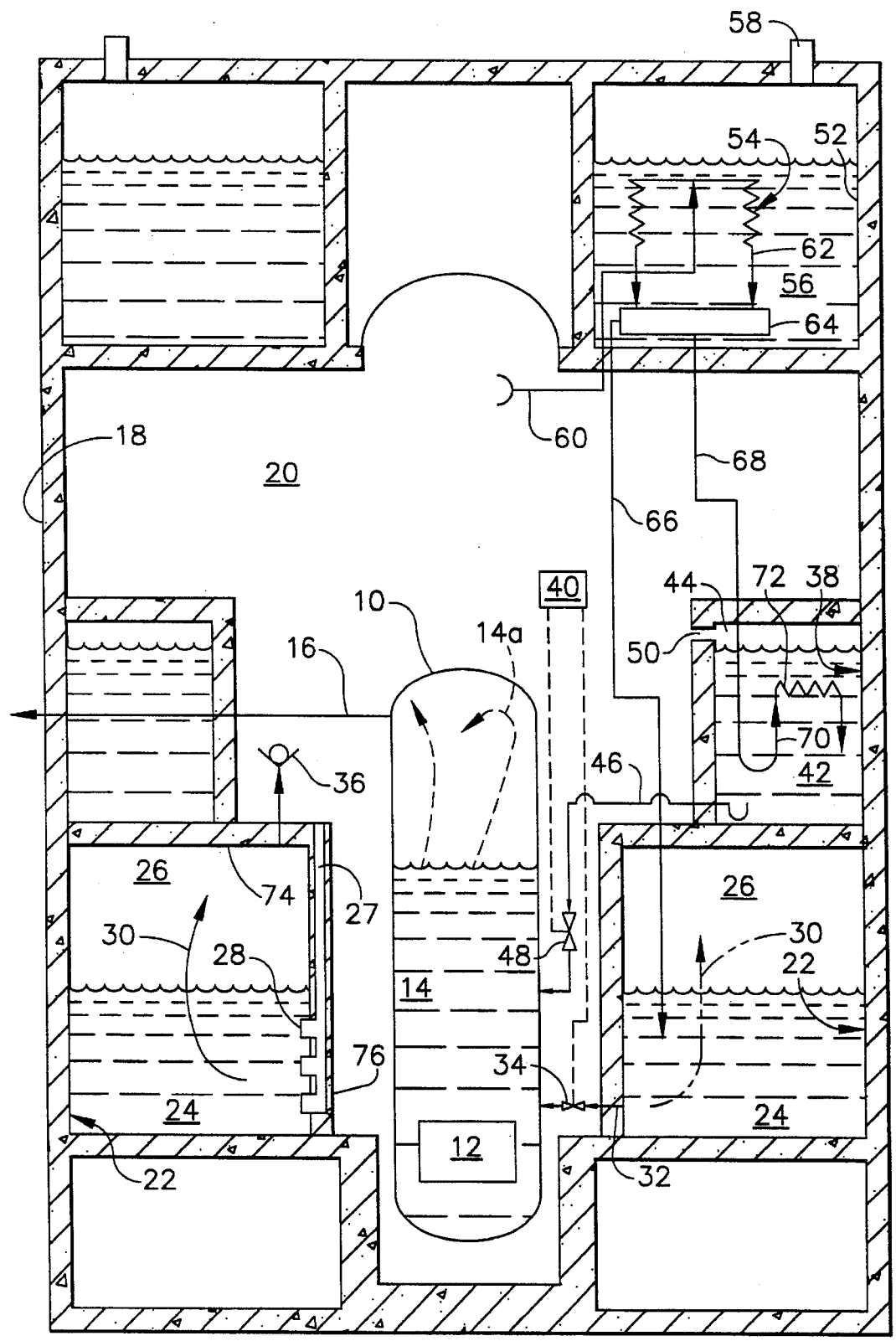
FIG. 1 is a schematic elevational sectional view of a boiling water reactor having a passive containment cooling system in accordance with a known design.
Figure 2:
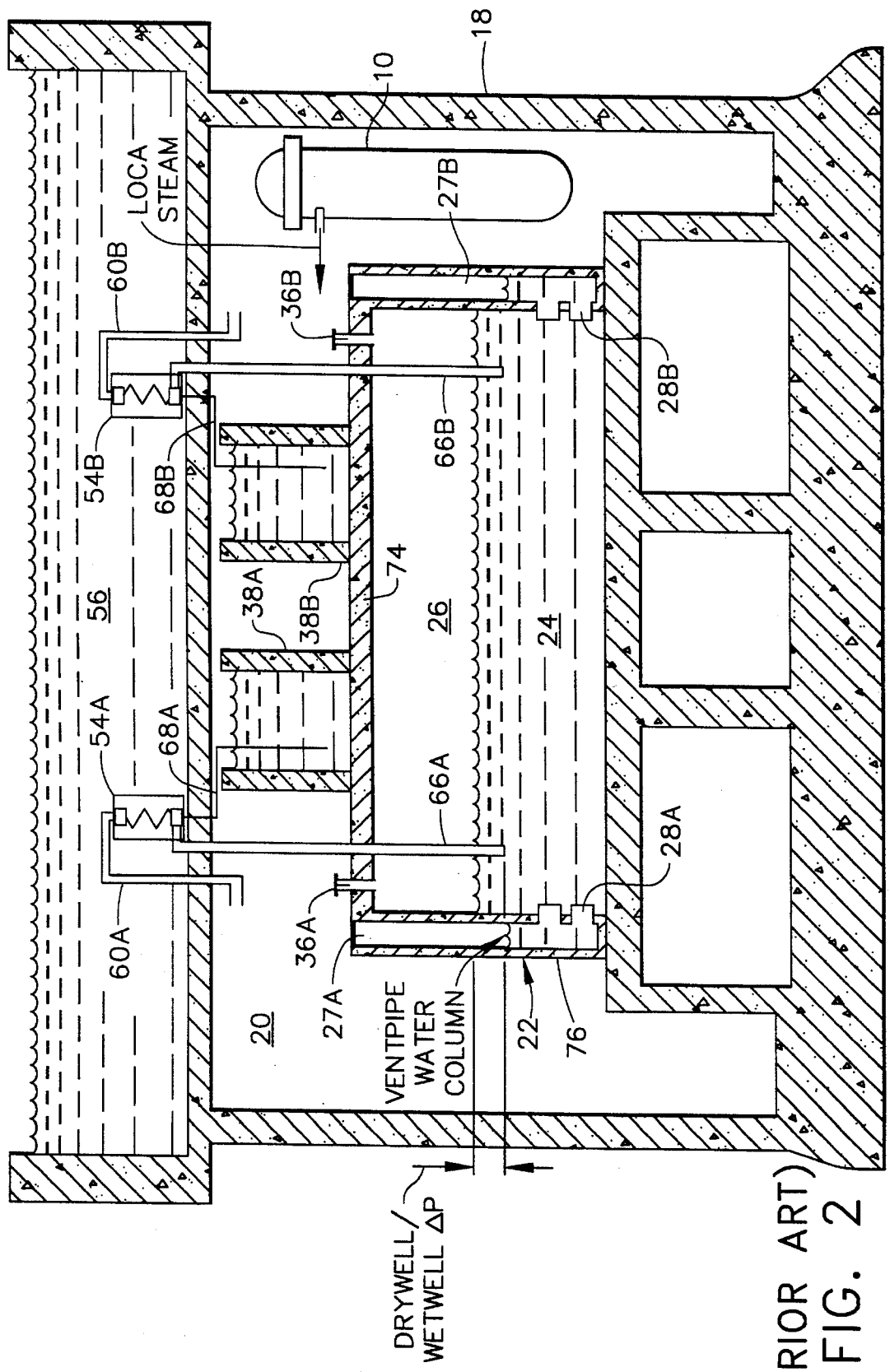
FIG. 2 is a schematic of the containment configuration for the BWR shown in FIG. 1 with fully closed vacuum breakers.
Figure 3:
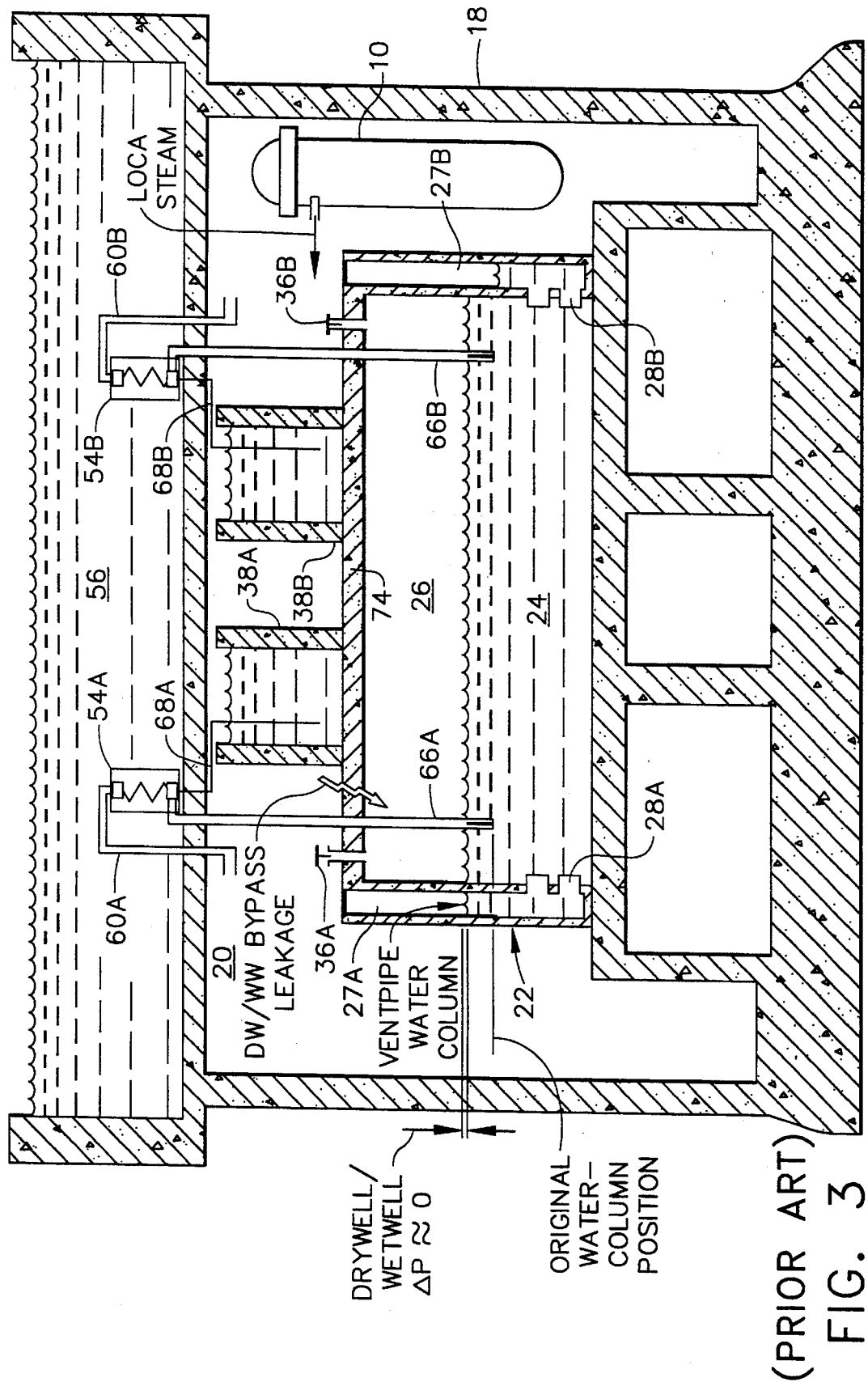
FIG. 3 is a schematic of the containment configuration for the BWR shown in FIG. 1 with one failed-open vacuum breaker or significant wetwell/drywell steam bypass leakage.
Figure 4:
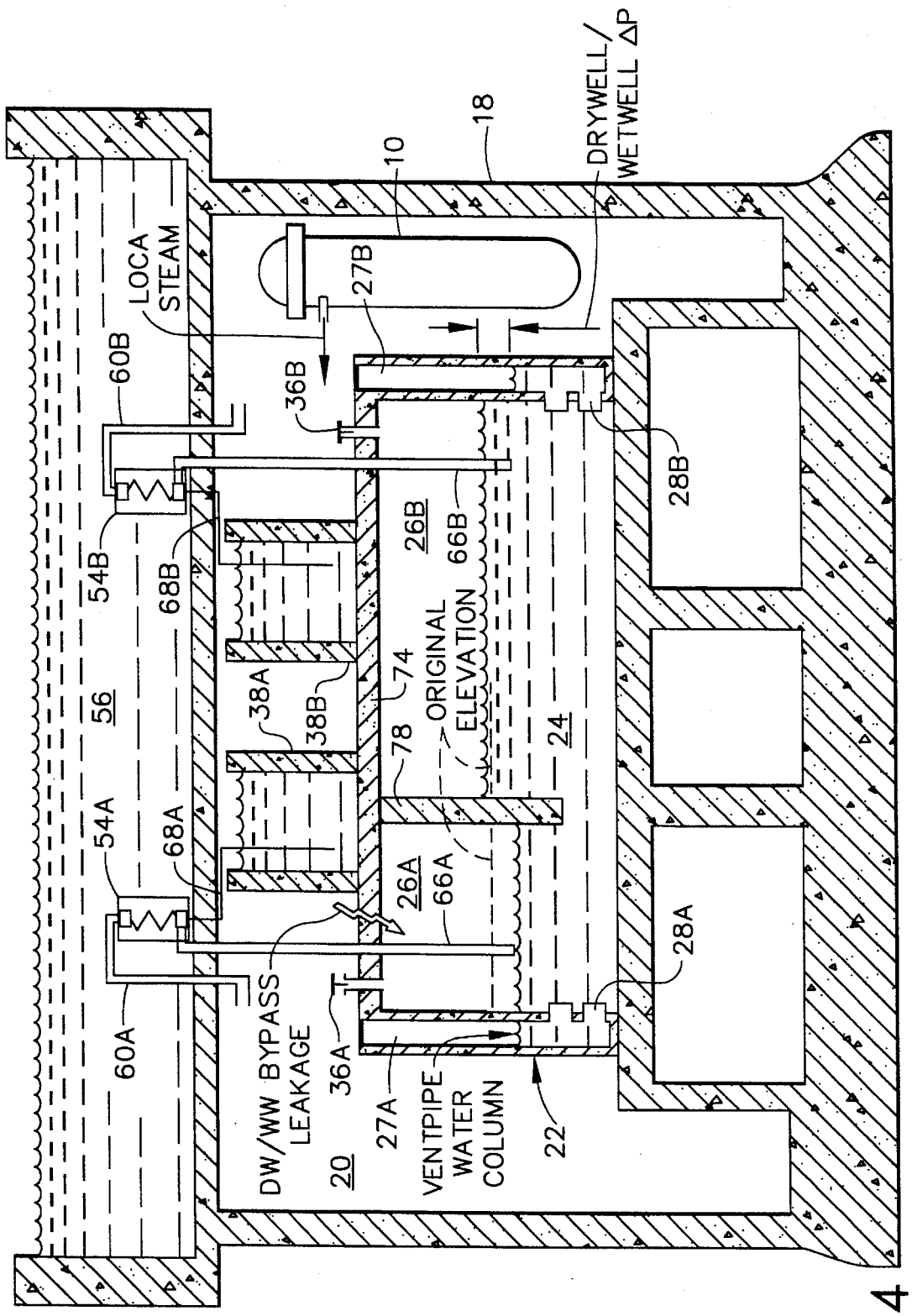
FIG. 4 is a schematic of the containment configuration for a BWR constructed in accordance with the present invention.

With reference to FIG. 4, the preferred embodiment of the present invention comprises a wetwell airspace which has been divided into a multiplicity of chambers through the use of wetwell airspace divider partitions or equivalent structure. The number of chambers resulting from incorporation of airspace divider partitions would, in the preferred embodiment, be matched one-for-one to the number of PCC heat exchangers provided for the PCCS. A multiplicity of single-disk vacuum breakers of ordinary design (or of developed high-reliability design) - generally using a minimum of one vacuum breaker per chamber but using more than one per chamber if economically advantaged - are provided to give a pressure-relieving pathway between each respective chamber and the (common) drywell airspace, which is not compartmentalized. For ease of discussion, FIG. 4 depicts a partition 78 which divides the wetwell airspace into two chambers 26A and 26B, which can communicate individually with the drywell 20 via respective vacuum breakers 36A and 36B. However, it is understood that the present invention encompasses the use of one or more partitions to form two or more wetwell airspace chambers.

Each wetwell airspace divider partition 78 is designed to provide leaktight structure (with, perhaps, steel plate bounding liners) spanning radially across the entire original SBWR wetwell airspace and extending from the diaphragm floor to partially (preferred embodiment) or fully (alternative embodiment) down into the suppression pool 24. The submergence into the pool by the airspace divider partition must be, as a minimum, the submergence designed for the PCC heat exchanger vent pipes 66A and 66B plus some margin. As can be seen from examination of FIG. 4, the compartmentalized wetwell airspace is thus made able to withstand the loss of any single chamber's driving ΔP - and therefore the loss of driving pressure causing flow through the respective PCC heat exchanger - while enabling all other chambers and their respective PCC heat exchangers to continue passive throughflow operation nominally unaffected by the event, whether this be a single active failed-open vacuum breaker condition or a high drywell/wetwell bypass leakage condition in the impaired chamber.

As seen in FIG. 4, a small portion of pool water inventory in the impaired chamber 26A will be displaced. This will cause a modest rise in the surface elevation of the pool in each of the other chambers (e.g., 26B). This will produce a sightly higher operating ΔP across the PCC heat exchanger/ vent pipe combination, as the vent pipe operational submergence has been increased (modestly). However, these conditions do not significantly affect the operations of the PCC heat exchanger 54B, as the higher ΔP is offset by the slightly longer water column now being expelled from the PCC heat exchanger vent pipes 66B.

Noncondensable gases originally in the impaired chamber's airspace will migrate (slowly) back to the drywell airspace once the vacuum breaker failure takes place. The noncondensable gases will then be swept up by the operating PCC heat exchangers and discharged into their respective connected chambers. Therefore a pro rata higher partial pressure for noncondensable gases will also develop in the unfaulted chambers. While containment peak pressure (at 72 hr post-LOCA) will thus be higher for the case of one vacuum breaker failed open, the containment/PCCS designer can minimize the extent of this incrementally increased pressure condition by utilizing either or both of the following means: (a) using more than three PCC heat exchangers (which is the number in the conventional SBWR) and therefore obtaining more than three wetwell airspace chambers; and (b) using individual PCC heat exchanger vent pipes, one per PCC heat exchanger lower drum (of which there are conventionally two such lower drums in each currently designed PCC heat exchanger), instead of using a combined PCC heat exchanger vent pipe (which, as now designed, accepts and merges noncondensable gases from both lower drums), and allocating an individual wetwell airspace chamber to each such PCC heat exchanger vent pipe.

As should be apparent from the foregoing disclosure, the present invention provides a containment system design for plants of the SBWR type characterized by their use of passive decay heat rejection systems which can meet design-for-licensability goals given either the consequence of a vacuum breaker in the failed open state or the consequence of a high drywell/wetwell bypass leakage state being present. The foregoing disclosed preferred embodiment incorporating at least one wetwell airspace divider partitions is an example of a containment configuration which accomplishes this goal. Other variations and modifications will be apparent to persons skilled in the design of passive pressure systems for boiling water reactors. All such variations and modifications are intended to be encompassed by the claims set forth hereinafter.

I claim:

1. A boiling water reactor comprising:

a containment vessel;

a reactor pressure vessel arranged inside said containment vessel;

a nuclear fuel core arranged inside said reactor pressure vessel;

wetwell means arranged inside said containment vessel, said wetwell means comprising first and second wetwell airspace chambers and first and second pools of water arranged such that said first wetwell airspace chamber overlies said first pool and said second wetwell airspace chamber overlies said second pool, said first and second pools of water being connected to allow free flow of water therebetween, and said first and second wetwell airspace chambers being separated such that gas cannot flow freely therebetween;

a drywell comprising a space inside said containment vessel and outside said reactor pressure vessel and said wetwell;

a condenser pool of water arranged above said drywell;

first and second condensers in heat transfer relationship with the water in said condenser pool;

first and second condenser inlet flow paths for coupling steam from said drywell into said first and second condensers respectively;

first and second condenser outlet flow paths for coupling gas from said first and second condensers respectively into said first and second pools of said wetwell respectively; and first and second venting means for respectively venting gas from said first and second wetwell airspace chambers to said drywell, each of said first and second venting means having a first state in which said respective venting means is closed and a second state in which said respective venting means is at least partially open.

2. The boiling water reactor as defined in claim 1, wherein said wetwell means comprise a diaphragm floor and a partition attached to and extending downward from said diaphragm floor, a first portion of said diaphragm floor and said partition forming part of said first wetwell airspace chamber, and a second portion of said diaphragm floor and said partition forming part of said second wetwell airspace chamber.

3. The boiling water reactor as defined in claim 2, wherein said partition is configured to block flow communication across said partition at elevations above the water level of the one of said first and second pools having a lower level than the level of said other of said first and second pools.

4. The boiling water reactor as defined in claim 1, wherein each of said first and second venting means comprises a vacuum breaker.

5. The boiling water reactor as defined in claim 2, wherein said first venting means comprises a first vacuum breaker which penetrates said first portion of said diaphragm floor and said second venting means comprises a second vacuum breaker which penetrates said second portion of said diaphragm floor.

6. A boiling water reactor comprising a containment vessel, a reactor pressure vessel surrounded by said containment vessel with a drywell therebetween, a nuclear fuel core arranged inside said reactor pressure vessel, a wetwell arranged inside said containment vessel and partly filled with water to form a suppression pool of water and a wetwell airspace of gas overlying the water in said suppression pool, a condenser pool of water arranged above said drywell, first and second condensers in heat transfer relationship with the water in said condenser pool, first and second condenser inlet flow paths for coupling steam from said drywell into said first and second condensers respectively, first and second condenser outlet flow paths for coupling gas from said first and second condensers respectively into said suppression pool, and first and second vacuum breakers for venting gas from said wetwell airspace to said drywell, the improvement wherein said wetwell airspace is divided into first and second gas-filled chambers by a partition arranged such that gas exiting said first and second condenser outlet flow paths rises into said first and second gas-filled chambers respectively, said first gas-filled chamber communicates and said second gas-filled chamber does not communicate with said drywell via said first vacuum breaker when said first vacuum breaker is open and said second vacuum breaker is closed, and said second gas-filled chamber communicates and said first gas-filled chamber does not communicate with said drywell via said second vacuum breaker when said first vacuum breaker is closed and said second vacuum breaker is open.

7. The boiling water reactor as defined in claim 6, wherein said partition comprises a vertical wall having a bottom boundary which is submerged in said suppression pool along the entire length of said vertical wall.

8. A boiling water reactor comprising:

a containment vessel;

a reactor pressure vessel arranged inside said containment vessel;

a nuclear fuel core arranged inside said reactor pressure vessel;

wetwell means arranged inside said containment vessel, said wetwell means comprising first and second wetwell airspace chambers and first and second pools of water arranged such that said first wetwell airspace chamber overlies said first pool and said second wetwell airspace chamber overlies said second pool, said first and second pools of water being connected to allow free flow of water therebetween, and said first and second wetwell airspace chambers being separated such that gas cannot flow freely therebetween;

a drywell comprising a space inside said containment vessel and outside said reactor pressure vessel and said wetwell;

a condenser pool of water arranged above said drywell;

heat exchange means in heat transfer relationship with the water in said condenser pool;

inlet flow path means for coupling steam from said drywell into said heat exchange means;

first and second outlet flow paths for coupling gas from said heat exchange means into said first and second pools of said wetwell respectively; and first and second venting means for respectively venting gas from said first and second wetwell airspace chambers to said drywell, each of said first and second venting means having a first state in which said respective venting means is closed and a second state in which said respective venting means is at least partially open.

9. The boiling water reactor as defined in claim 8, wherein said wetwell means comprise a diaphragm floor and a partition attached to and extending downward from said diaphragm floor, a first portion of said diaphragm floor and said partition forming part of said first wetwell airspace chamber, and a second portion of said diaphragm floor and said partition forming part of said second wetwell airspace chamber.

10. The boiling water reactor as defined in claim 9, wherein said partition is configured to block flow communication across said partition at elevations above the water level of the one of said first and second pools having a lower level than the level of said other of said first and second pools.

11. The boiling water reactor as defined in claim 8, wherein each of said first and second venting means comprises a vacuum breaker.

12. The boiling water reactor as defined in claim 9, wherein said first venting means comprises a first vacuum breaker which penetrates said first portion of said diaphragm floor and said second venting means comprises a second vacuum breaker which penetrates said second portion of said diaphragm floor.

* * * * *